(12) United States Patent
Asakura et al.

(10) Patent No.: US 6,496,623 B2
(45) Date of Patent: Dec. 17, 2002

(54) OPTICAL DEVICE, OPTICAL COMMUNICATION COMPONENT AND OPTICAL TRANSMISSION APPARATUS

(75) Inventors: Hiroyuki Asakura, Osaka; Eiji Tanaka, Kyotanabe, both of (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/812,842

(22) Filed: Mar. 21, 2001

(65) Prior Publication Data

US 2001/0026660 A1 Oct. 4, 2001

(30) Foreign Application Priority Data

Mar. 22, 2000 (JP) .................................. 2000-080620

(51) Int. Cl.[7] .................................................. G02B 6/42
(52) U.S. Cl. .................................................... 385/47
(58) Field of Search .......................... 385/15, 16, 24, 385/31, 37, 47, 48, 147

(56) References Cited

U.S. PATENT DOCUMENTS

| | | | |
|---|---|---|---|
| 3,799,673 A | * 3/1974 | Random, Jr. | ................. 356/513 |
| 4,732,449 A | 3/1988 | Fan | |
| 5,193,132 A | * 3/1993 | Uken et al. | .................... 385/32 |
| 5,267,077 A | * 11/1993 | Blonder | ....................... 359/280 |
| 5,848,211 A | * 12/1998 | Yang et al. | ................... 359/664 |
| 5,854,867 A | 12/1998 | Lee et al. | |

FOREIGN PATENT DOCUMENTS

JP 6-44158 6/1994

* cited by examiner

Primary Examiner—Akm E. Ullah
(74) Attorney, Agent, or Firm—Smith, Gambrell & Russell, LLP

(57) ABSTRACT

An optical device, has
  at least two first optical components;
  a second optical component placed between the first optical components, or at an intersection point of optical axes to be formed by the first optical components; and
  a placement member for placing the first optical component and the second optical component,
  wherein the placement member has at least a groove portion for placing the first optical component, and
  each portion of the first optical component and each portion of the groove portion have such a shape and size that optical axes to be formed by the first optical components are positioned within the same plane respectively in a state in which the first optical components are all placed on the groove portion.

32 Claims, 15 Drawing Sheets

34

35

OPTICAL DEVICE, OPTICAL COMMUNICATION COMPONENT AND OPTICAL TRANSMISSION APPARATUS

BACKGROUND OF THE INVENTION

1. Field of the Invention

The present invention relates to an optical device for use in an optical communication system, a method of manufacturing the optical device, an optical communication component and an optical transmission apparatus.

2. Related Art of the Invention

In recent years, the optical fiber communication system has remarkably been developed, and has been applied and put into practical use in public communication, CATV, a computer network and the like. In the optical fiber communication system, there are used optical communication components for partially separating signals transmitted through optical fiber or attenuating signal strength.

There is, for example, an optical multiplexer/demultiplexer in the wavelength multi-optical transmission system for transmitting a multi-channel signal through one optical fiber cable. The optical multiplexer wavelength multiplexes signals of each channel from an optical transmitter through the use of optical signals having different wavelength to transmit to an optical receiver through one optical fiber cable. The optical receiver divides the optical signal having desired wavelength by an optical demultiplexer having a wavelength selecting function for demodulation. Further, there is an optical add/drop component for tapping only optical signals having specific wavelength, and on the other hand, allowing other optical signals to pass as they are.

FIGS. 7 and 8 are an external view and a structural cross-sectional view respectively showing one of conventional examples for the optical multiplexer, which is an optical communication component. A wavelength multi-signal from an input fiber 71 is collimated by a lens 83 and is incident on an optical filter 86 for separating signals. Light within a specific wavelength range is reflected or is allowed to pass therethrough by this optical filter 86, and those light is combined through lens 93 and 88 and is taken out at an output fiber 73 and an optical fiber 76. The optical fiber and the lens are fixed to a holder, and the optical filter and the optical axis are adjusted and are fixed by adhesion or welding.

In the structure of such a conventional optical communication component as described above, however, in order to minimize the combination loss, it is necessary to perform optical axis adjustment for the input fiber and output fiber through each lens with accuracy at micron level. For this reason, it takes time to adjust the assembly.

Also, after the optical axis adjustment, it is necessary to fix the holders 74 by adhesion through members, but misregistration may occur at the time of this fixing. Therefore, the yield is reduced.

Also, since the optical communication component manufactured as described above has been increased in cost, an optical communication transmission apparatus and system using the same would be increased in cost, and as a result, low-priced communication service has been difficult to be realized.

SUMMARY OF THE INVENTION

It is an object of the present invention to solve the above-described problems and to provide an optical device, optical communication components and optical communication transmission apparatus system easier to assemble, having simpler structure at lower manufacturing cost than the conventional example.

The 1st invention of the present invention is an optical device, comprising:

at least two first optical components;

a second optical component placed between said first optical components, or at an intersection point of optical axes to be formed by said first optical components; and a placement member for placing said first optical component and said second optical component, wherein said placement member has at least a groove portion for placing said first optical component, and each portion of said first optical component and each portion of said groove portion have such a shape and size that optical axes to be formed by said first optical components are positioned within the same plane respectively in a state in which said first optical components are all placed on said groove portion.

The 2nd invention of the present invention is the optical device according to 1st invention, wherein optical axes of said first optical components are formed to become parallel said groove portion on which said first optical component is placed.

The 3rd invention of the present invention the optical device according to 1st invention, wherein said first optical components and an inner wall of said groove portion are at least in point-contact at least at two points at cross-sectional view direction of said groove portion.

The 4th invention of the present invention is the optical device according to 1st invention, wherein a convex portion or a concave portion having a predetermined shape is formed at a position on said placement member whereat said second optical component is placed, and on a base of said second optical component, there is formed a concave portion or a convex portion having a shape, which corresponds to said convex portion or concave portion having said predetermined shape of said placement member.

The 5th invention of the present invention is the optical device according to 4th invention, wherein said predetermined shape is any of shapes of a polygon pyramid, a cone, a polygon pillar, and a column or substantially hemispherical shape.

The 6th invention of the present invention is the optical device according to 4th invention, wherein said convex portion or concave portion having said predetermined shape is formed when each of said grooved portions is extended, and is intersected each other at a position whereat said second optical component is placed.

The 7th invention of the present invention is the optical device according to any one of 1st to 4th inventions, further comprising a clamping member for fixing said first optical components and said second optical component in cooperation with said placement member, wherein said first optical components and said second optical component are fixed in such a manner as to be sandwiched between said clamping member and said placement member, and said first optical component is fixed in a state where it can be freely inserted and removed.

The 8th invention of the present invention is the optical device according to any one of 1st to 4th inventions, further comprising a clamping member for fixing said first optical components and said second optical component in cooperation with said placement member, wherein said first optical components and said second optical component are fixed in such a manner as to be sandwiched between said clamping member and said placement member, an upper portion of said first optical components are exposed on a principal surface of said placement member other than said groove portion in a state where said first optical components are placed on said groove portion, and said clamping member is fixed by contact with said exposed upper portion of said first optical components.

The 9th invention of the present invention is the optical device according to any one of 1st to 4th inventions, wherein said first optical components or said second optical component include at least a lens and/or an optical fiber.

The 10th invention of the present invention is the optical device according to any one of 1st to 4th inventions, wherein said first optical components or said second optical component include at least a ferrule provided at an end portion of said optical fiber.

The 11th invention of the present invention is the optical device according to 9th inventions, wherein within said groove portion, an end surface of said lens and an end surface of said optical fiber are in point-contact or plane-contact.

The 12th invention of the present invention is the optical device according to 9th invention, wherein a focus of said lens is positioned on an end surface of said optical fiber.

The 13th invention of the present invention is the optical device according to 12th invention, wherein said lens is a bi-convex or single convex cylindrical lens.

The 14th invention of the present invention is the optical device according to 12th invention, wherein said lens is a graded-index lens.

The 15th invention of the present invention is the optical device according to 12th invention, wherein said lens is a spherical lens having a refractive index of 2 or closest thereto.

The 16th invention of the present invention is an optical communication component using the optical device according to any one of 1st to 15th inventions, wherein said second optical component includes at least an optical functional device.

The 17th invention of the present invention is the optical communication component according to 16th invention, wherein said optical functional device has wavelength separating and/or combining functions.

The 18th invention of the present invention is the optical communication component according to 16th invention, wherein said optical functional device has polarization separating and/or synthesizing functions.

The 19th invention of the present invention is the optical communication component according to 16th invention, wherein said optical functional device has an optical attenuation function.

The 20th invention of the present invention is the optical communication component according to 16th invention, wherein said optical functional device has an optical isolator.

The 21st invention of the present invention is the optical communication component according to 16th invention, wherein said optical functional device has an optical circulator.

The 22nd invention of the present invention is the optical communication component according to 16th invention, wherein said optical functional device has an optical terminating function.

The 23rd invention of the present invention is the optical communication component according to 16th invention, wherein said optical functional device has an optical modulating function.

The 24th invention of the present invention is the optical communication component according to 16th invention, wherein said optical functional device has optical branching and/or synthesizing functions.

The 25th invention of the present invention is the optical communication component according to 16th invention, wherein said optical functional device has an optical switching function.

The 26th invention of the present invention is the optical communication component according to 14th invention, wherein said optical functional device has a light amplifying function.

The 27th invention of the present invention is the optical communication component according to 16th invention, wherein said optical functional device has a wavelength converting function.

The 28th invention of the present invention is the optical communication component according to 16th invention, wherein said optical functional device has a light emitting function.

The 29th invention of the present invention is the optical communication component according to 16th invention, wherein said optical functional device has a light receiving function.

The 30th invention of the present invention is the optical communication component according to 16th invention, wherein said optical functional device has a polarization converting function.

The 31st invention of the present invention is an optical transmission apparatus, comprising:

The optical communication component according to any of 16th to 30th inventions;

optical transmission means; and optical receiving means, wherein said optical transmission means and said optical receiving means are connected to each other through said optical communication component.

The 32nd invention of the present invention is a manufacturing method of an optical device having at least two first optical components; and a second optical component placed between said first optical components, or at an intersection point of optical axes to be formed by said first optical components, comprising the steps of:

forming a groove portion on a placement member body;

forming a placement portion on said placement member body;

placing and fixing said first optical components on said groove portion;

placing said second optical component on said placement portion;

adjusting said second optical component to set an optical path for said second optical component and said first optical components; and fixing said second optical component adjusted.

BRIEF DESCRIPTION OF THE DRAWINGS

FIG. 1 is a perspective view showing a configuration of an optical communication component according to a first embodiment of the present invention.

FIG. 2 is a block diagram showing a structure of the optical communication component in FIG. 1.
FIG. 4 is a block diagram showing a configuration of an optical communication component according to a second embodiment of the present invention.
FIG. 5 is a view showing a collimator component of the optical communication component of FIG. 2.
FIG. 7 is an external view showing an optical communication component according to the prior art.
FIG. 8 is a cross-sectional structural view showing the optical communication component according to the prior art in FIG. 7.
FIG. 9 is perspective view showing an optical communication component according to a third embodiment of the present invention.
FIG. 10 is a block diagram showing an optical transmission apparatus according to the present invention.
FIGS. 12(a)–(b) are a perspective view showing a fit-in structure portion of the optical functional device of the optical communication component according to the present invention.
FIGS. 13(a)–(b) are a view showing a manufacturing process for an optical communication component according to the present invention.
FIGS. 14(a)–(b) are a block diagram showing an optical communication component according to the embodiment of the present invention.
FIGS. 15(a)–(b) are a view showing a groove of the optical communication component according to another embodiment of the present invention.

DESCRIPTION OF SYMBOLS

Figure 1:
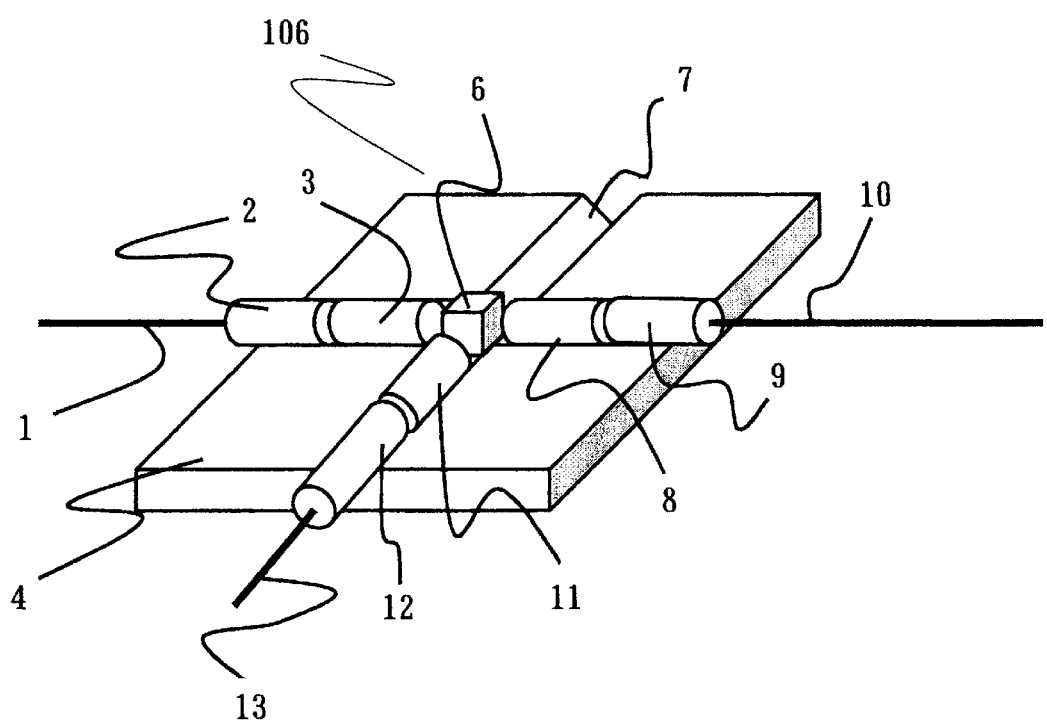
[FIG. 1]

1 Input fiber
2, 9, 12 Ferrule
3, 8, 11 Lens
4 V-grooved substrate
6 Optical functional device
7 V-groove
10, 13 Output fiber
41, 43, 41 Ball lens
51, 53 Clamping substrate
105 Optical multiplexer
106 Optical demultiplexer
119 Optical transmission apparatus

PREFERRED EMBODIMENTS OF THE INVENTION

Hereinafter, with reference to the drawings, the description will be made of embodiments according to the present invention.

(First Embodiment)

FIG. 1 is a perspective view showing a configuration of an optical communication component according to a first embodiment of the present invention. In FIG. 1, reference numeral 1 denotes an input fiber; 2, 9 and 12, ferrules; 3, 8 and 11, lenses; 4, a V-groove substrate; 6, an optical functional device; 7, a V-groove; and 10 and 13, output fiber. As an example of the optical communication component, an optical multiplexer 106 has been cited.

An operation of an optical communication component according to the first embodiment of the present invention having such a configuration as described above is as follows: A signal light is incident from the input fiber 1. The tip end of the input fiber 1 is fixed to the ferrule 2, and incident light emitted from the tip end of the input fiber 1 is incident on the optical functional device 6 through the lens 3. In the following description, the optical functional device 6 will be described by designating the identical reference numeral as the optical filter.

The lens 3 has a biconvex or single convex shape at its end surface, and is in contact with the ferrule end. The optical filter 6 has, for example, a wavelength separating function, and one reflected by signal light having specific wavelength is combined with the output fiber 13 fixed onto the ferrule 12 through the lens 11. Still, the optical filter 6 also operates as a filter having a wavelength combing function when it is input a light with opposite direction.

The light which has further passed through the optical filter 6 as it is is combined with the output fiber 10 fixed to the ferrule 9 through the lens 8 to separate desired light.

Figure 2:
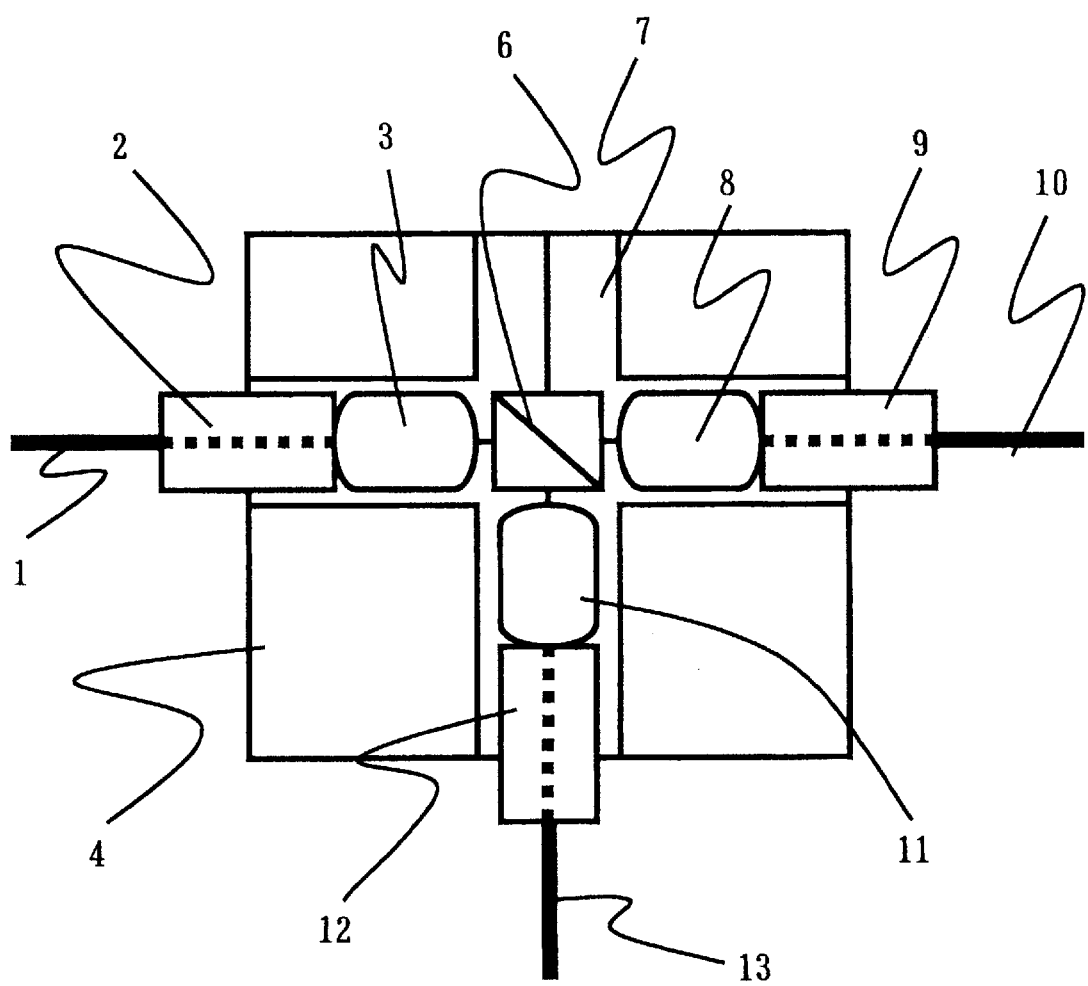
[FIG. 2]

The lenses 3, 8 and 11 to be used here have a convex shape at both ends thereof as shown in FIG. 2, and are in a physically contacted state with the end surface of each ferrule 2, 9, 12. The end surface of each ferrule has been spherical surface abraded so as to come into a physical contact.

For the lens 3, 8, 11, if its refractive index is a refractive index of the core portion of the optical fiber 1, 10, 13, for example, a quartz-series optical fiber, glass material having a refractive index of about 1.45 will be used. If performed as described, Fresnel reflection at the contact surface with the ferrule will be reduced, making it possible to increase the reflection loss with less loss.

Focuses of the lens 3, 8 and 11 are set to the lens end surface, whereby it is not necessary to perform focal position adjustment for the fiber or the ferrule and the lens, but the optical adjustment can be performed only by placing the ferrule opposite the lens.

Further, these optical components such as lens 3, 8 and 11 and ferrules 2, 9 and 12 are all placed on the substrate 4 having the V-groove 7. Each ferrule is caused to coincide with the outside diameter of the lens, whereby it becomes possible to cause the optical axes to coincide with each other by placing the lens and the ferrule in the V-groove 7, and to cause the optical axis of the input fiber 1 to coincide with the optical axes of the output fiber 10 and 13 without any adjustment. For this reason, even if any optical registration of the individual fibers is not performed, assembly adjustment of the optical communication components can be performed only depending upon mechanical precision in sizes and dimensions of the V-grooved substrate 4, the ferrules 2, 9 and 12, and the lenses 3, 8 and 11.

Figure 11:
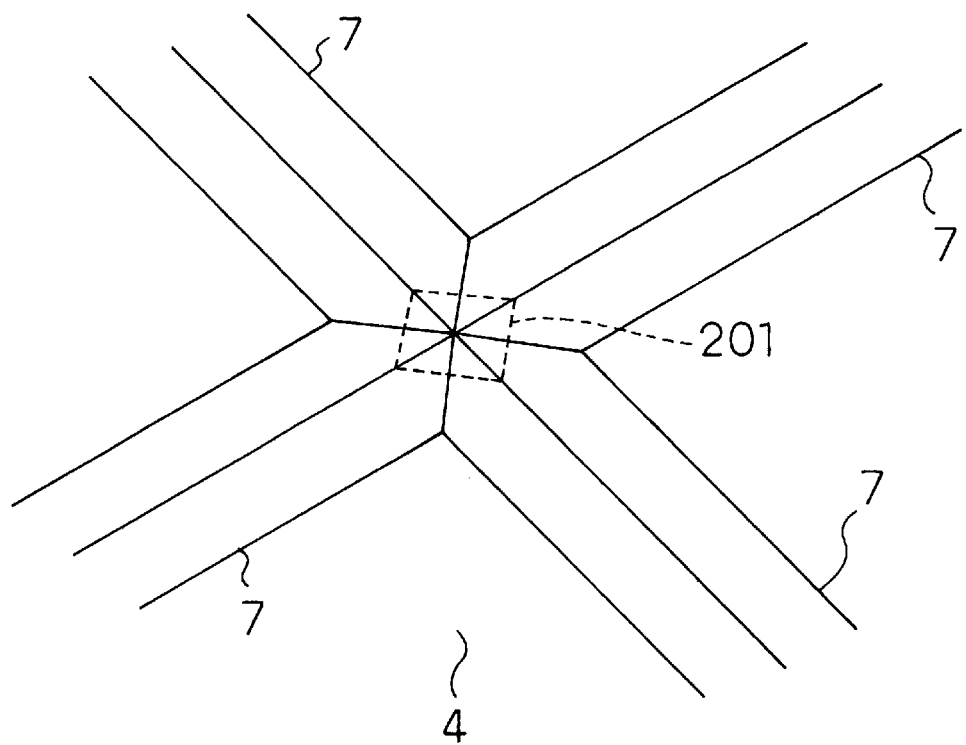
[FIG. 11]
FIGS. 11(a) and (b) are a perspective view showing a placement portion of an optical functional device of the optical communication component according to the present invention.
Figure 11:
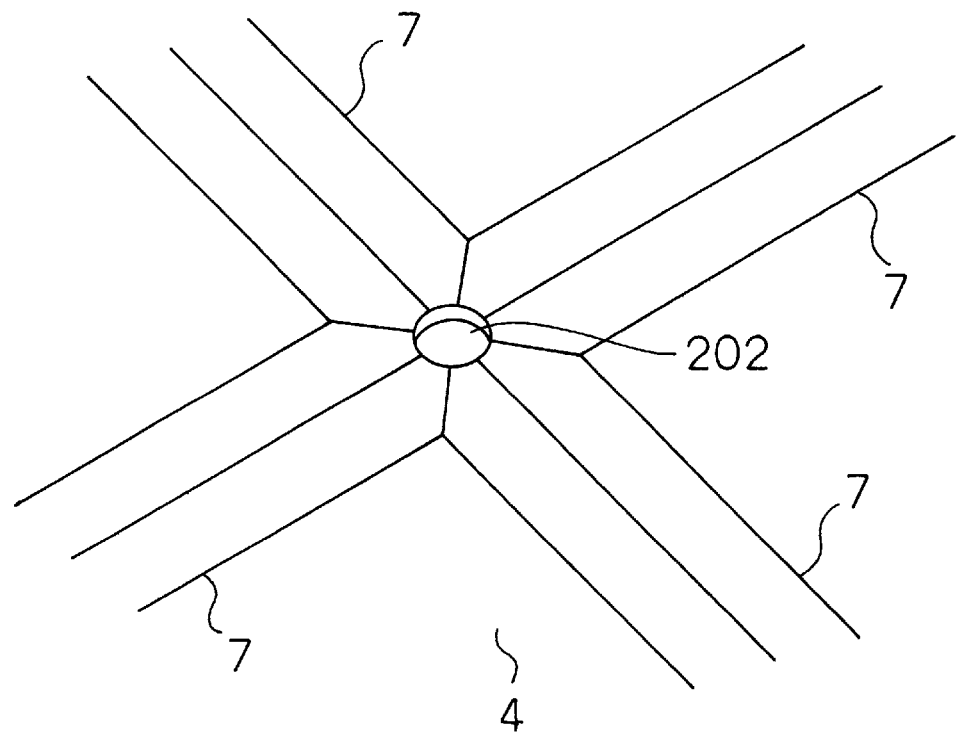
Figure 12:
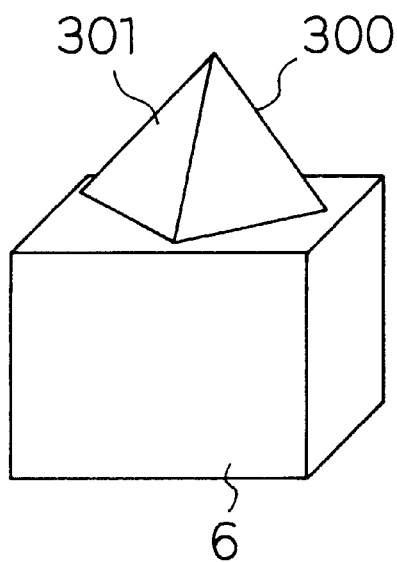
[FIG. 12]
Figure 12:
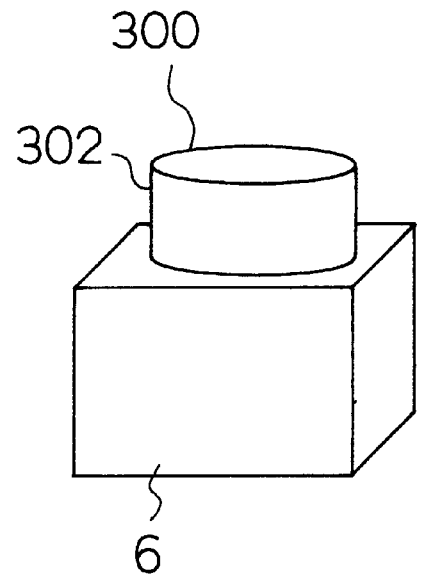
Figure 12:
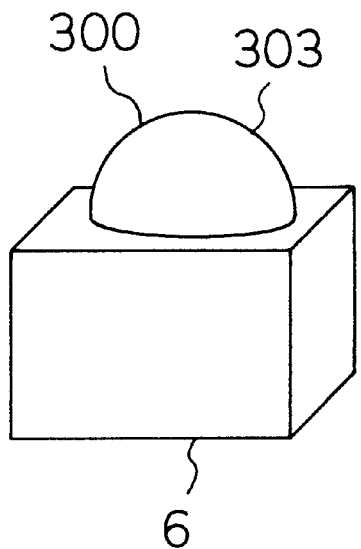
Figure 12:
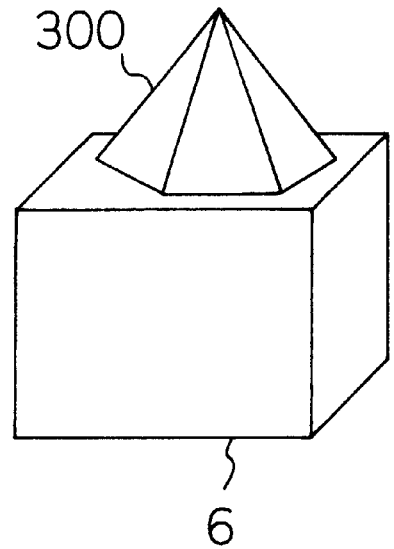

Next, as regards placement of the optical functional device 6, there is provided a placement portion for placing the optical functional device 6 in a predetermined place on the one V-groove 7 of the V-grooved substrate 4, or at a position whereat a plurality of V-grooves 7 intersect each other. The placement portion can be realized as a fill-in structure in which the optical functional device 6 is fixed by fitting-in, and is constructed such that it is formed as a pyramid concave-shaped hole 201 to be formed by intersection of V-grooves 7, indicated by dotted line in, for example, FIG. 11(a), or as a circular hole 202 provided at an intersected position as shown in FIG. 11(b) in such a manner that the base of the optical functional device 6 can be fitted in. On the other hand, a fit-in structure portion 300 at the base of the optical functional device 6 will be formed as such a quadrangular pyramid convex shape 301 as to be embedded in correspondingly to the pyramid concave-shaped hole 201 as shown in FIG. 12(a), or as such a cylindrical hole 302 or a hemispherical hole 303 as to be embedded in correspondingly to the hole 202 as shown in FIGS. 12(b) and 12(c).

Thereby, setting of optical axes of optical fiber such as the input fiber 1 and the output fiber 10, 13 and the optical functional device 6 can be also performed depending upon only mechanical precision in sizes and dimensions of the V-grooved substrate 4, the ferrules 2, 9 and 12, and the lenses 3, 8 and 11 without the need for optical registration.

Figure 13:
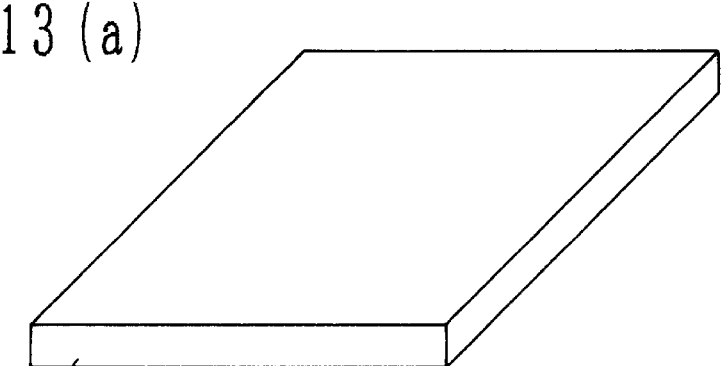
[FIG. 13]
Figure 13:
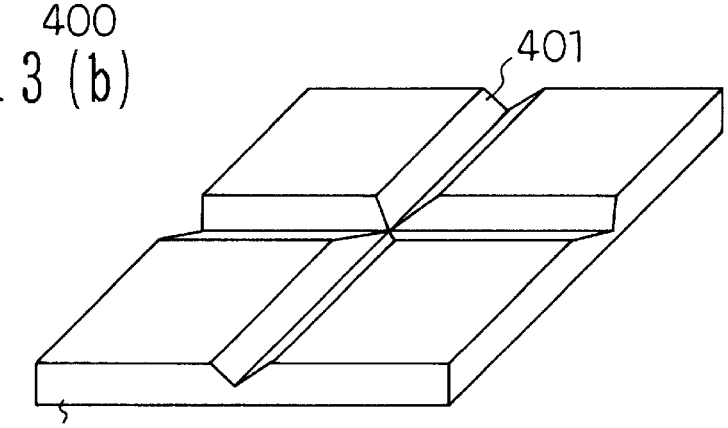
Figure 13:
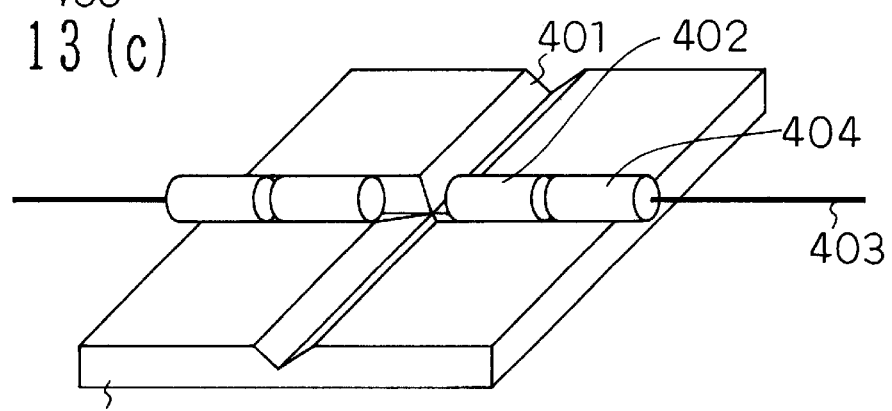
Figure 13:
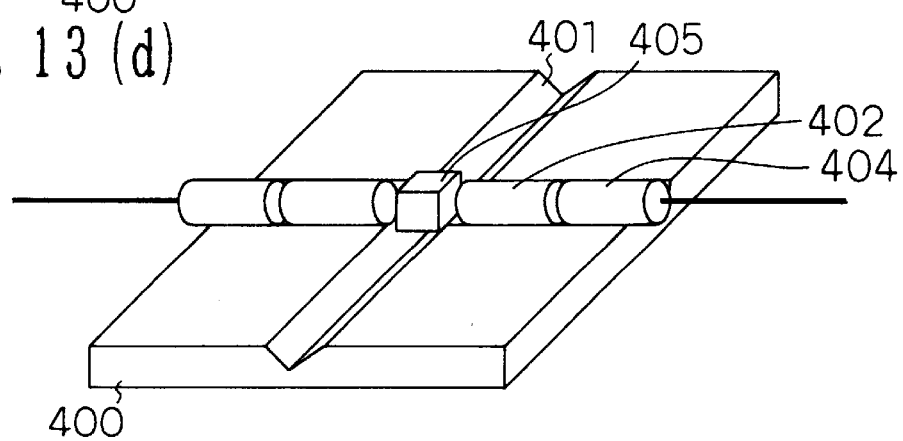

Such an optical device according to the present embodiment is manufactured as below. FIG. 13 is an explanatory view for illustrating a method of manufacturing an optical device according to the present embodiment. First, a placement member body 400 shown in FIG. 13(a) will be formed with V-grooves (FIG. 13(b)).

Next, a ferrule 403, to which a lens 401 and an optical fiber 402 have connected, will be placed on the V-groove (FIG. 13(c)).

Finally, an optical functional device 404 will be placed on the intersected portion of the V-groove 400, and be fixed after optical axis alignment with the lens 401 is performed.

In this respect, in the above description, the description has been made of the configuration of the placement portion as the pyramid concave shaped hole 201 or the circular hole 202, but the shape of the hole does not have to be limited to the circular shape, but the shape of the base of the optical functional device 6 may be a polygon, which has more sides than the triangle, or a predetermined shape as long as it can be fitted in correspondingly to the shape of the hole 202. Also, the shape of the fit-in structure portion 300 is not restricted to the cylindrical shape or a polygon pillar shape, but may be polygon pyramid-shaped, conical or hemispherical as long as its cross-section corresponds to the shape of the placement portion. Also, it is not necessary to fabricate it as a complete hemisphere, but a shape obtained by cutting a predetermined portion off a sphere may be used. In this respect, the circle of the pillar and cone in the present invention may be a non-complete circle, and the cross-section may include an elliptical shape.

Also, in the present embodiment, for the lens, a graded-index lens may be used. The graded-index lens is provided with a lens effect by causing the refractive index of the lens to have predetermined refractive index distribution in the axial direction of the lens or in a direction perpendicular thereto.

Similarly, a rod lens formed with a reflection lens on the end surface thereof may be used.

If a curvature radius of the contact surface between the lens and the fiber according to the present invention is caused to coincide with an abrasive curvature radius of the ferrule within a range of 20 to 60 mm, an excellent contact will be obtained.

Figure 3:
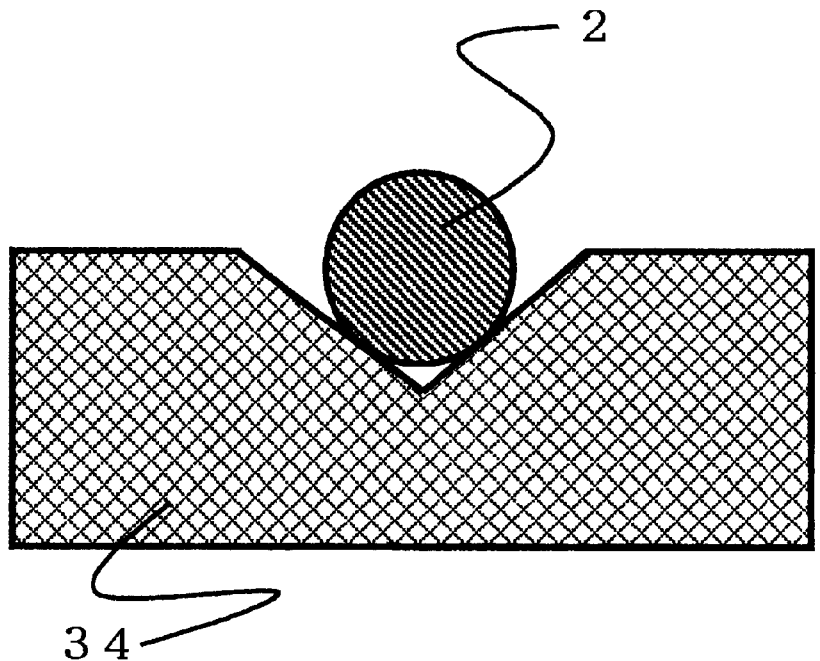
[FIG. 3]
FIGS. 3(a) and (b) are a cross-sectional view showing the optical communication component of FIG. 1.
Figure 3:
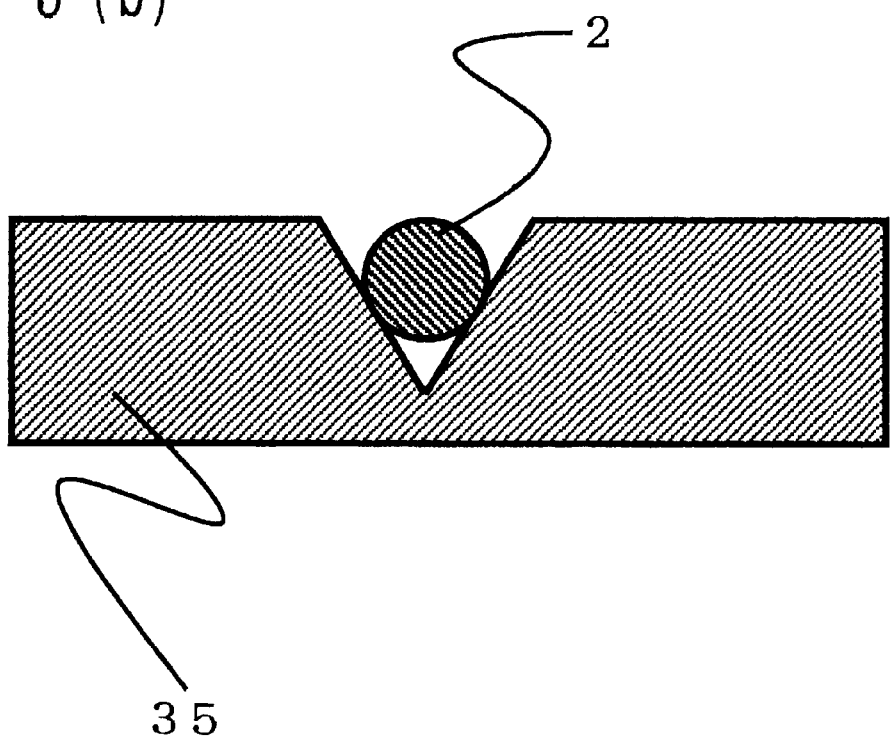

FIGS. 3(a) and 3(b) show a cross-section of a V-grooved substrate 4 and a lens 2 placed thereon. FIG. 3(a) shows an embodiment in which a shallow V-groove 34 is used, and FIG. 3(b) shows a case where a deep V-groove 35 is used.

Figure 6:
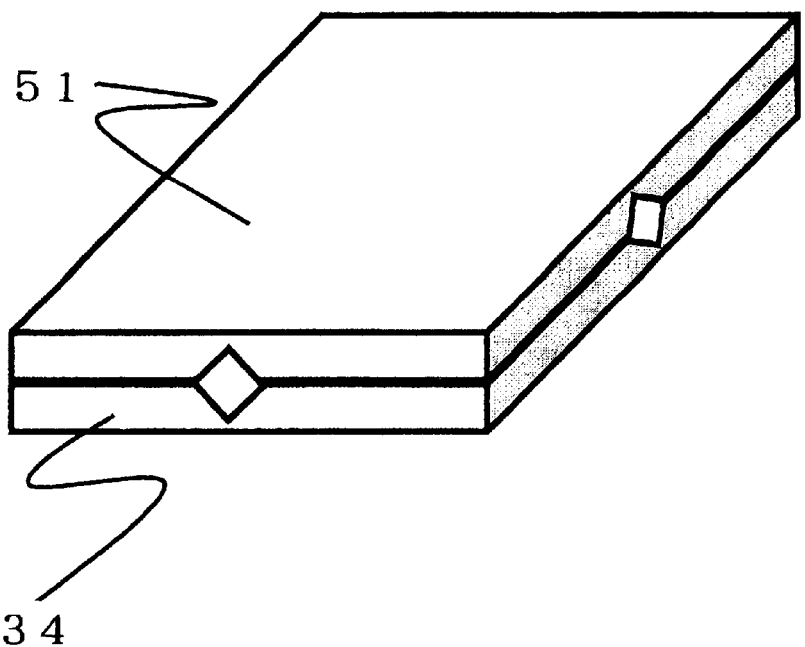
[FIG. 6]
FIGS. 6(a) and (b) are an external view showing the optical communication component of FIG. 1 in the embodiment.
Figure 6:
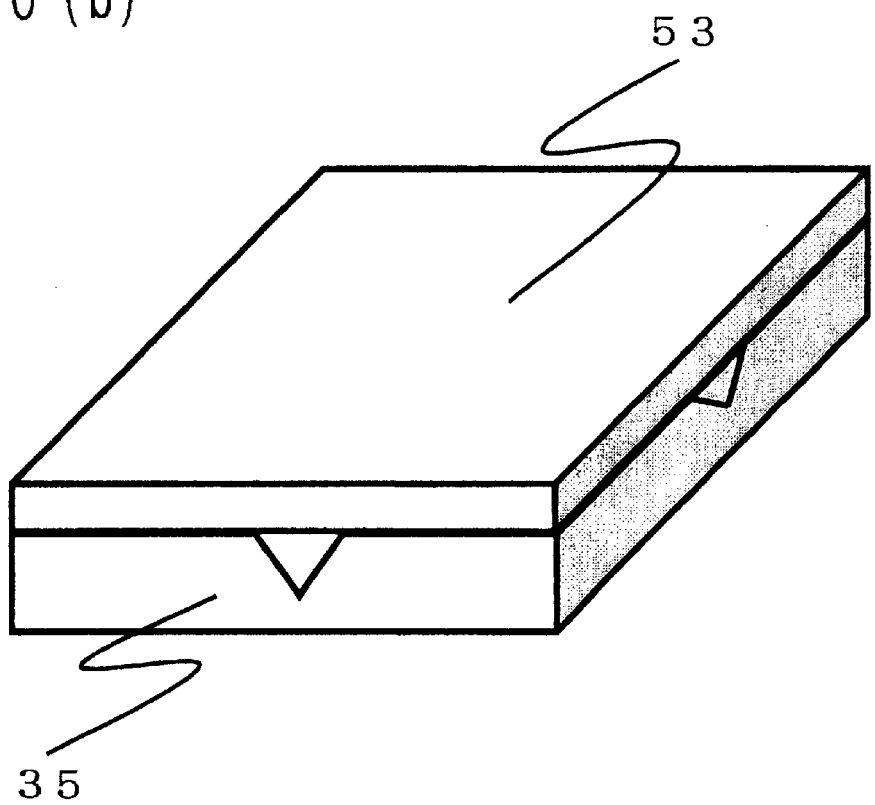
Figure 7:
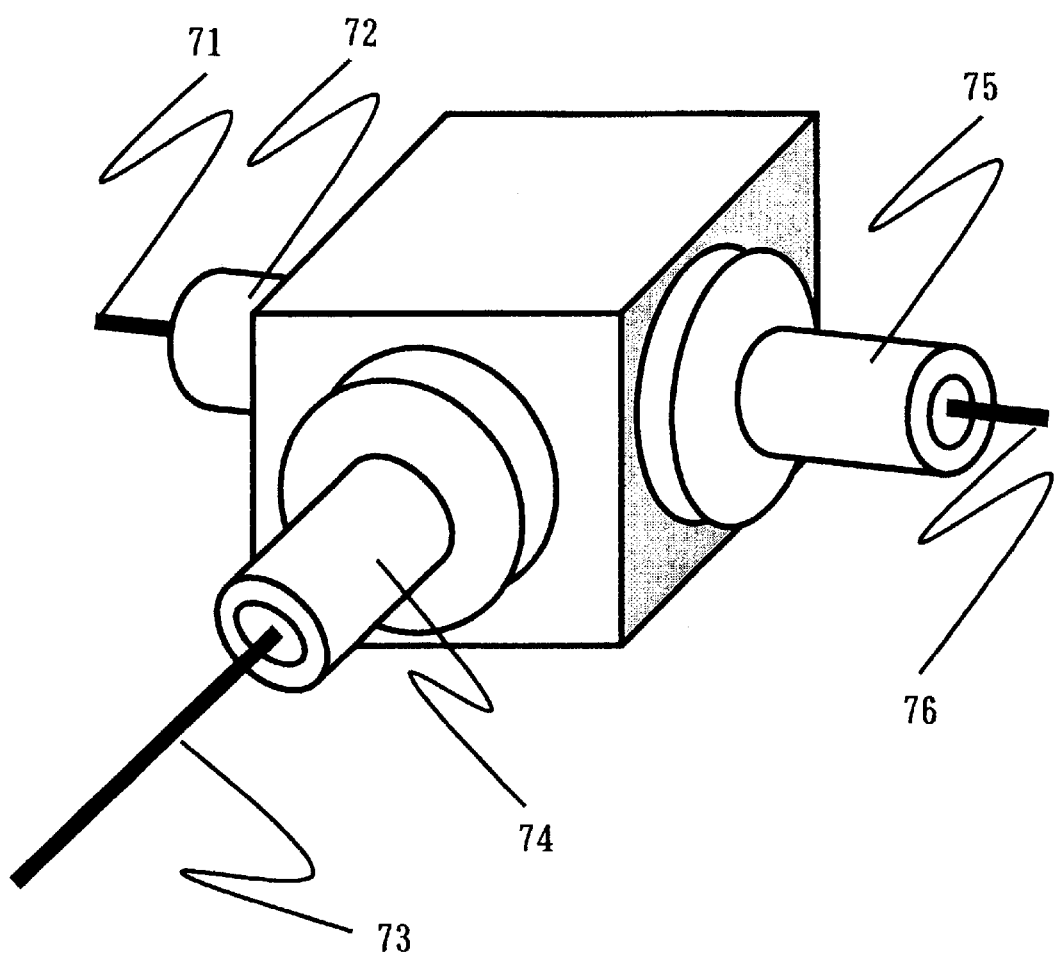
[FIG. 7]
Figure 8:
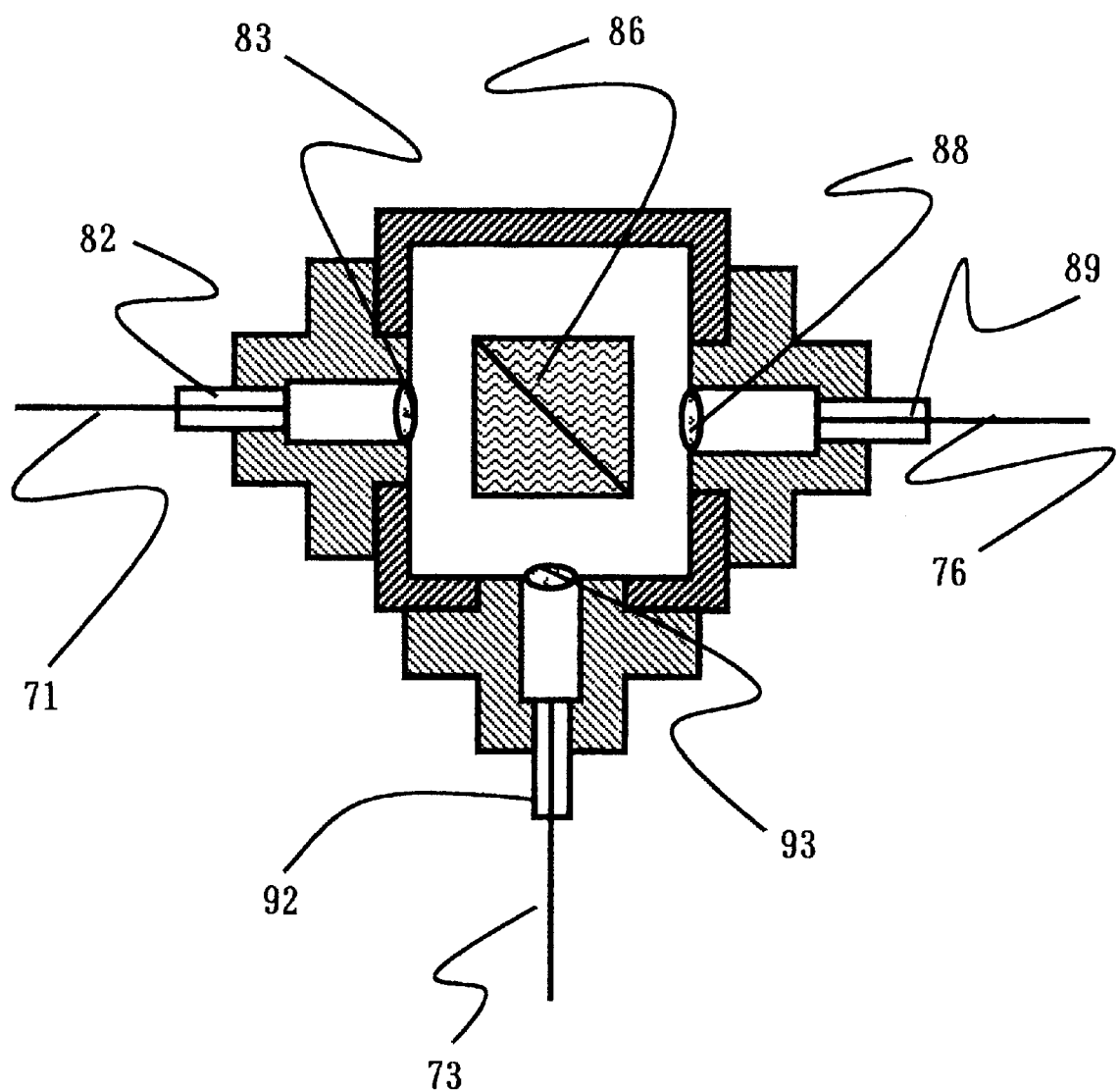
[FIG. 8]

FIGS. 6(a) and 6(b) show embodiments corresponding to FIGS. 3(a) and 3(b) respectively. In this case, optical component clamping substrates 51 and 53 are used, whereby it is not necessary to fix the ferrule of the optical fiber onto the substrate, but the former can be removed.

Since the optical fiber can be simply removed with the configuration, there is an advantage that excellent workability is provided when installing it to the apparatus. Also, the optical communication component can be directly reflow-fixed to an apparatus substrate. The clamping substrate 51 shows an example in which a V-grooved substrate is used, and the clamping substrate 53 shows an example in which a flat plate is used. In this respect, the clamping substrate 53 shows an example of clamping members according to the present invention, and its shape does not have to be restricted to examples shown in FIGS. 3(a) and 3(b), but any shape may be used as long as it is such a shape that the optical fiber can be fixed to allow it to be inserted and removed in cooperation with the V-grooved substrate 4.

Figure 14:
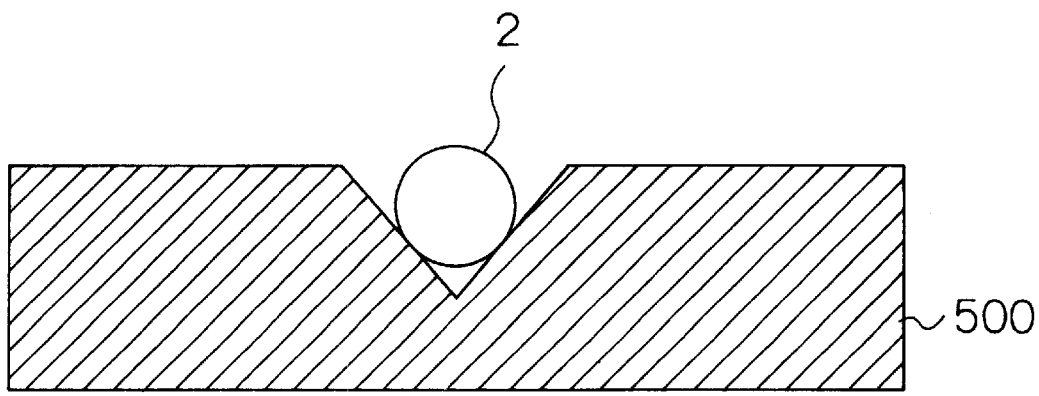
[FIG. 14]
Figure 14:
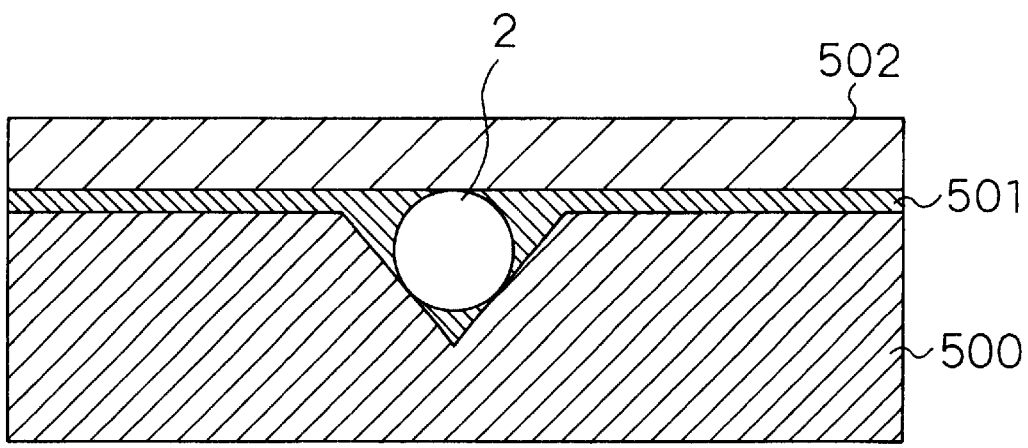

Next, FIG. 14 shows examples of other configurations using the V-grooved substrate and the clamping substrate. In an embodiment shown in FIG. 14(a), through the use of a V-grooved substrate 500 having a V-groove having intermediate depth between the shallow V-groove of the V-grooved substrate 34 shown in FIG. 3(a) and the deep V-groove of the V-grooved substrate 35 shown in FIG. 3(b), the upper portion of the lens 2 placed slightly protrudes from the principal surface of the upper portion of the substrate.

In an embodiment shown in FIG. 14(b), a clamping substrate 502, which is an example of the clamping member according to the present invention, is placed on the V-grooved substrate 500 in this state, and a lens 2 is fixed by means of the weight of the clamping substrate 502 in such a manner that the upper surface of the lens 2 contacts the clamping substrate 502.

Further, the entire surface of a joining area between the clamping substrate 502 and the principal surface of the upper portion of the V-grooved substrate 500 will be coated with adhesive 501 for temporary tacking, and finally the whole will be sealed. Thereby, an optical communication component with the V-grooved substrate, the clamping substrate and the lens integrally formed can be obtained. In this respect, in the above description, the description has been made of a case where the temporary tacking is performed through the use of the adhesive 501, but it may be performed by soldering.

(Second Embodiment)

Figure 4:
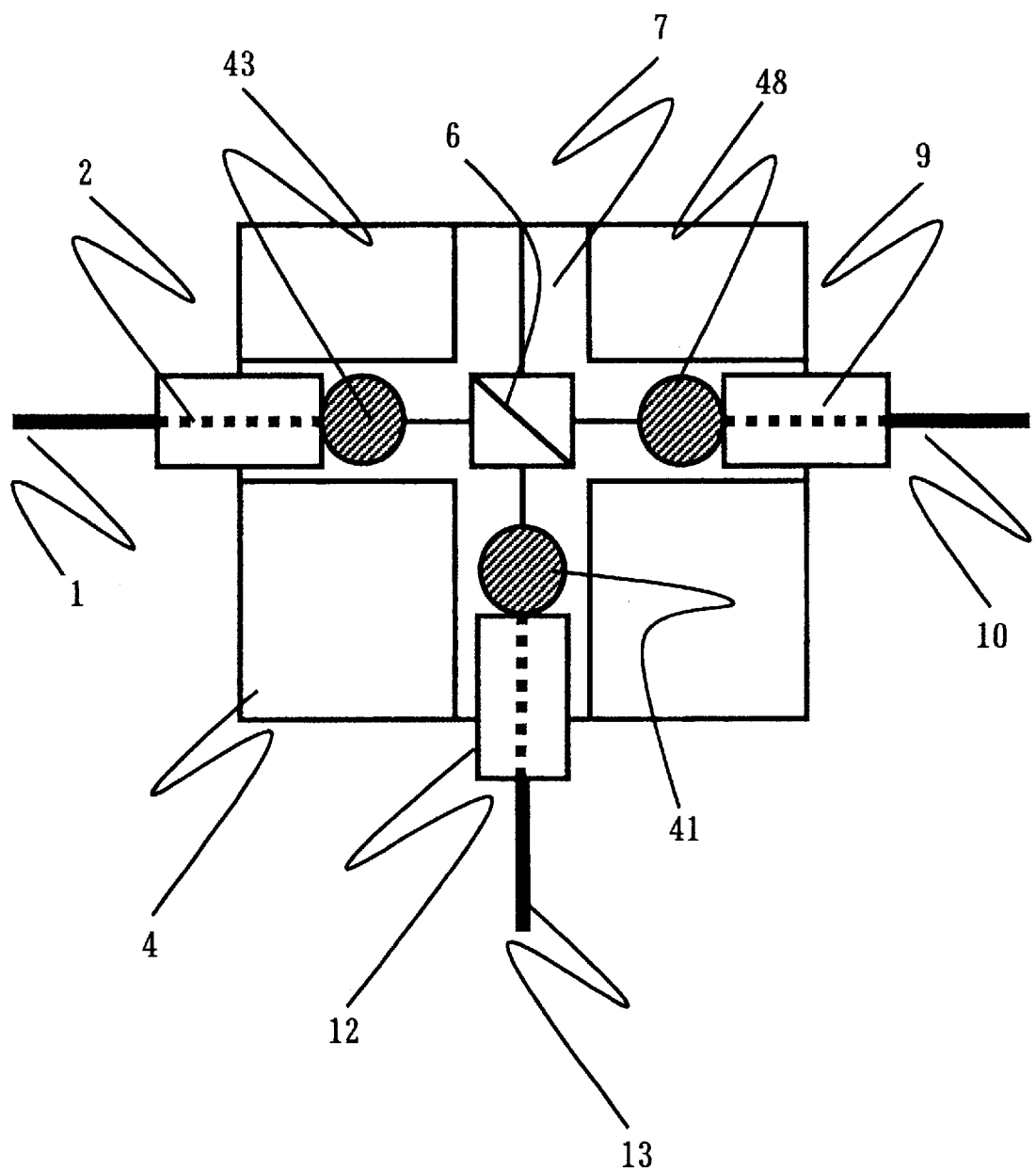
[FIG. 4]

FIG. 4 is a top view showing a configuration of an optical communication component according to a second embodiment of the present invention. In FIG. 4, the identical reference numerals to FIG. 1 denote the identical portions or corresponding portions. Reference numeral 41, 43, 48 denotes a ball lens which is an example of a spherical lens of the present invention.

An optical communication component according to a second embodiment of the present invention, having such configuration as described above conforms to the first embodiment in basic configuration and operation, but is different in that a ball lens is used for the lens.

Figure 5:
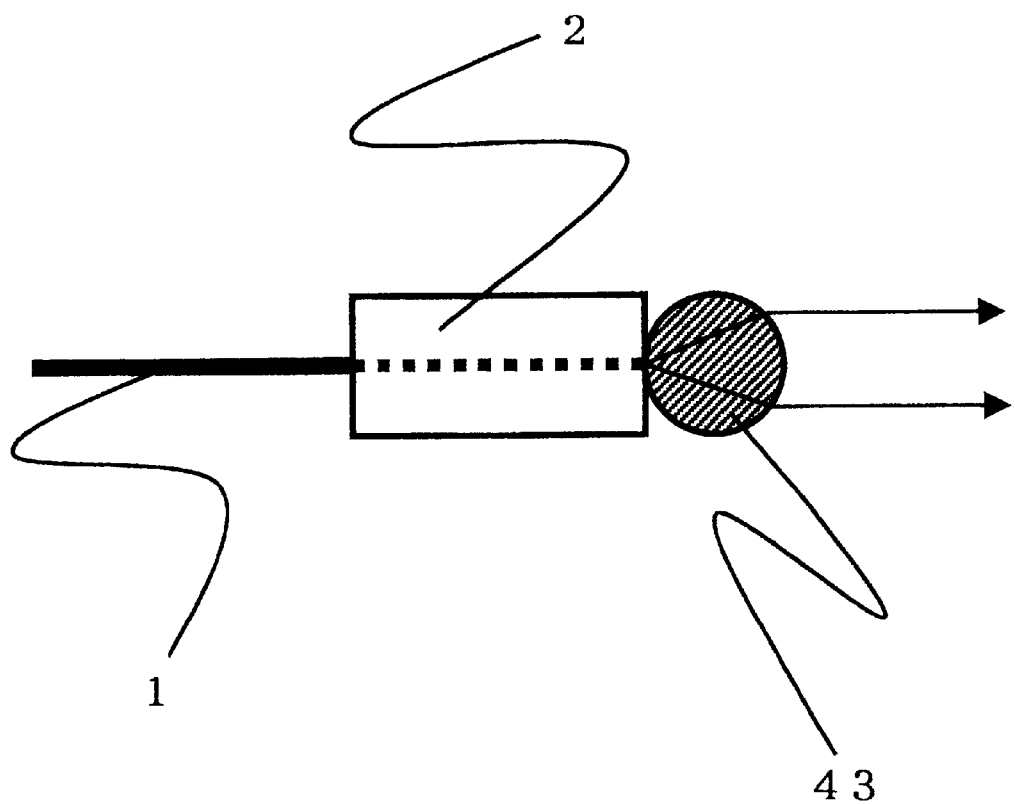
[FIG. 5]

FIG. 5 is an enlarged view for an input fiber 1. If a ball lens 43 has a refractive index of 2, the end surfaces of the optical fiber 1 and the fiber 2 are only caused to contact the end surface of the ball lens 43, whereby light from the optical fiber 1 will become parallel light. Therefore, through the use of the ball lens, it is not necessary to adjust the lens focus, but light to be inputted into and outputted from the optical functional device 6 can be obtained as parallel light irrespective of the size of the ball lens.

Accordingly, since more allowance for the diameter of the ball lens is given, there is an effect that the lens price will be decreased.

In this respect, the refractive index does not require to be strictly 2, but those showing a value close thereto, for example, as glass material, products with models LaSFn9, LaSFn18, LaSFn35, TaFD43, LaH71, and LaH79 manufactured by Schott Glasswerke., in Germany, and the like can be used.

(Third Embodiment)

In the first embodiment of the present invention, there has been described an example in which an optical filter is used as the optical functional component 6, but in the similar configuration to the first or second embodiment, if an optical functional device 6 having polarization separation and/or synthesis functions, for example, a polarization beam splitter is used, a polarization separating component will be able to be obtained in a simple configuration.

(Fourth Embodiment)

Figure 9:
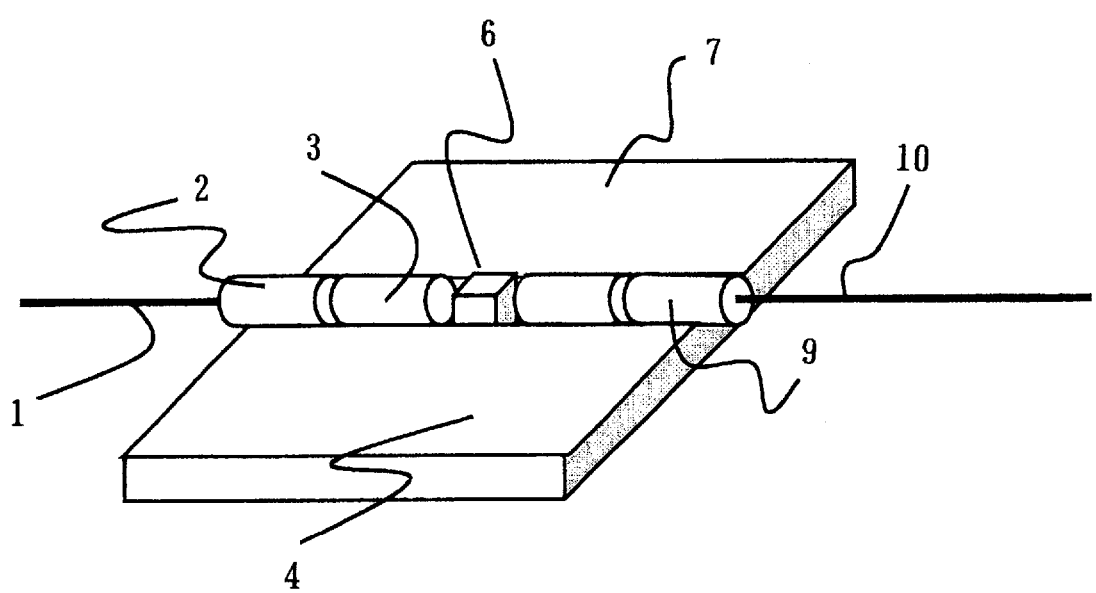
[FIG. 9]

In the first embodiment of the present invention, there has been described an example in which an optical filter is used as the optical functional component 6, but, if an optical functional device 6 having an optical attenuation function is used in the similar configuration to the first or second embodiment, an optical attenuator will be able to be obtained in a simple configuration. FIG. 9 is a perspective view showing an optical communication component when an optical attenuator is configured. In this case, a pair of input/output fibers will suffice.

(Fifth Embodiment)

In the first embodiment of the present invention, there has been described an example in which an optical filter is used as the optical functional component 6, but, if a device having a magnet, a photo-electro-magnetic effect element such as, for example, YIG and an optical directional function such as a polarizer or a rutile crystal is used as the optical functional device 6 in the similar configuration to the first or second embodiment, an optical isolator or an optical circulator depending upon the configuration will be able to be obtained in a simple configuration.

In this respect, the optical isolator has the configuration of FIG. 9, and the optical circulator has the similar configuration to FIG. 1.

(Sixth Embodiment)

In the first embodiment of the present invention, there has been described an example in which an optical filter is used as the optical functional component 6, but, if a device having light absorption or light scattering function is used as the optical functional device 6 in the similar configuration to the first or second embodiment, an optical terminating apparatus component will be able to be obtained in a simple configuration. However, the optical terminating apparatus is an apparatus which causes reflected light from an optical fiber end which is not used not to be generated.

(Seventh Embodiment)

In the first embodiment of the present invention, there has been described an example in which an optical filter is used as the optical functional component 6, but, if a device having a light modulation function, for example, a lithium-naiovate crystal which is an electro-optics device, a light absorption type semiconductor device and the like are used as the optical functional device 6 in the similar configuration to the first or second embodiment, an optical attenuator will be able to be obtained in a simple configuration.

FIG. 9 is a block diagram showing an optical attenuator according to a seventh embodiment of the present invention, and a pair of the input/output fibers will suffice as shown in FIG. 9. A modulation signal is given from the outside, whereby signal light from the input fiber is modulated to thereby take out from the output fiber.

(Eighth Embodiment)

In the first embodiment of the present invention, there has been described an example in which an optical filter is used as the optical functional component 6, but, if a device having an optical synthesize and/or branch function is used as the optical functional device 6 in the similar configuration to the first or second embodiment, an optical multiplexer/demultiplexer will be able to be obtained in a simple configuration. In this case, the input/output fibers of a number corresponding to the number of the multiplexing or branches can be provided.

(Ninth Embodiment)

In the first embodiment of the present invention, there has been described an example in which an optical filter is used as the optical functional component 6, but, if a device having a light switching function is used as the optical functional device 6 in the similar configuration to the first or second embodiment, an optical switching apparatus will be able to be obtained in a simple configuration.

(Tenth Embodiment)

In the first embodiment of the present invention, there has been described an example in which an optical filter is used as the optical functional component 6, but, if a device having a light amplifying function, for example, a semiconductor device and light exciting type rare earth elements added glass or fiber and the like are used as the optical functional device 6 in the similar configuration to the first or second embodiment, a light amplifier will be able to be obtained in a simple configuration.

(Eleventh Embodiment)

In the first embodiment of the present invention, there has been described an example in which an optical filter is used as the optical functional component 6, but, if a device having a wavelength converting function, for example, a semiconductor device and the like are used as the optical functional device 6 in the similar configuration to the first or second embodiment, a wavelength converter will be able to be obtained in a simple configuration. In this respect, as an example of the semiconductor device, a semiconductor laser, a semiconductor light amplifier device and the like can be used.

(Twelfth Embodiment)

In the first embodiment of the present invention, there has been described an example in which an optical filter is used as the optical functional component 6, but, if a device having a light emitting function, for example, a semiconductor laser device, LED and the like are used as the optical functional device 6 in the similar configuration to the first or second embodiment, an optical communication component for optical transmitters will be able to be obtained in a simple configuration.

(Thirteenth Embodiment)

In the first embodiment of the present invention, there has been described an example in which an optical filter is used as the optical functional component 6, but, if a device having a light receiving function, for example, a photodiode and the like are used as the optical functional device 6 in the similar configuration to the first or second embodiment, an optical communication component for optical receivers will be able to be obtained in a simple configuration.

(Fourteenth Embodiment)

In the first embodiment of the present invention, there has been described an example in which an optical filter is used as the optical functional component 6, but, if a device having a polarization converting function, for example, an analyzer, a polarimeter or the like is used as the optical functional device 6 in the similar configuration to the first or second embodiment, a polarization control optical communication component will be able to be obtained in a simple configuration.

(Fifteenth Embodiment)

Figure 10:
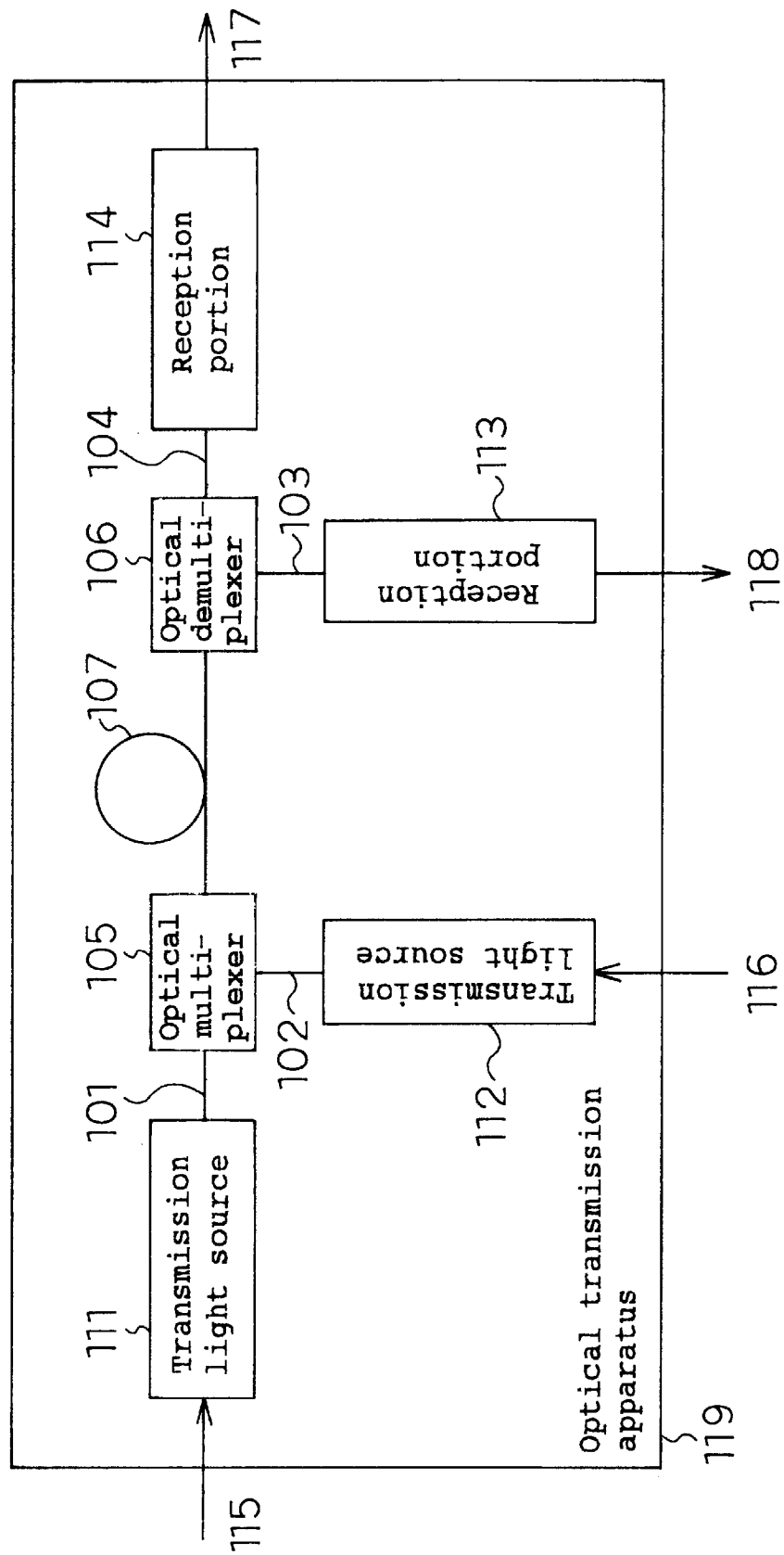
[FIG. 10]

FIG. 10 shows an optical transmission apparatus according to a fifteenth embodiment of the present invention. As shown in FIG. 10, in the transmission apparatus according to the present embodiment, two transmission signals 115 and 116 are converted into optical signals by transmission light sources 111 and 112 having different wave length, and thereafter, these optical signals are merged into one by an optical multiplexer 105 to be transmitted to the reception side by a transmission fiber 107.

The wavelength multi-signal light transmitted by the transmission fiber 107 is signal-separated by the optical demultiplexer 106, and each signal is converted to the original electric signals 117 and 118 by receivers 113 and 114.

In this case, the optical multiplexer 105 and the optical demultiplexer 106 are the same as those indicated in the first embodiment respectively. An optical transmission apparatus according to the embodiment of the present invention has an advantage that a large amount of information can be transmitted at low cost in a simple configuration through the use of one transmission fiber 107 and further the optical multiplexer 105 and the optical demultiplexer 106.

In this respect, in the optical transmission apparatus according to the present invention, embodiments on a wavelength multiple system have been indicated, but an optical transmission apparatus using optical communication components according to the present invention is not limited thereto, but an optical transmission apparatus in which optical communication components complying with the system have been incorporated can be configured.

Figure 15:
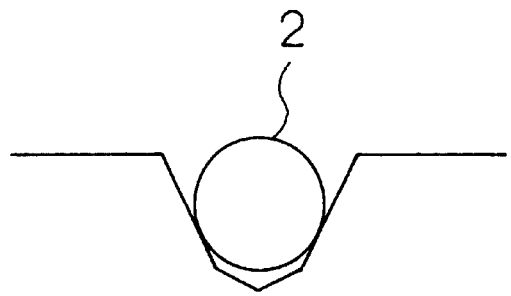
[FIG. 15]
Figure 15:
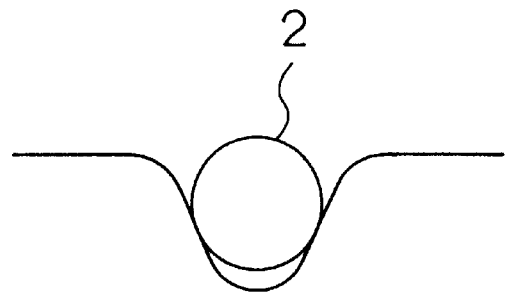
Figure 15:
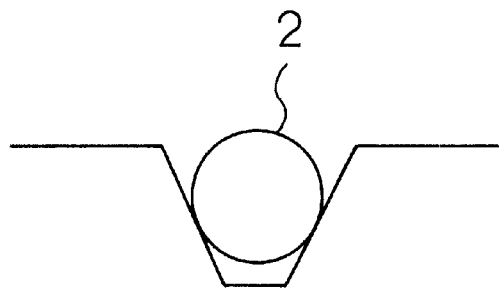
Figure 15:
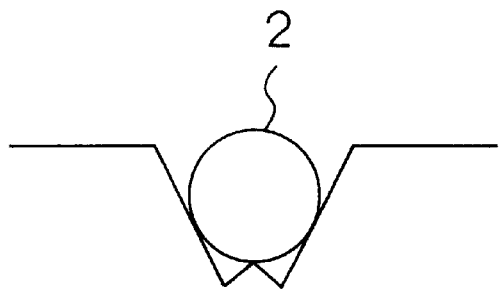

In this respect, in each of the above-described embodiments, the description has been made of the groove portion, on which the lens 2, the ferrules 2, 9 and 12, and the like are placed, as the V-groove, but a groove portion according to the present invention can be configured such that with the first optical component placed, the optical component and the inner wall of the groove portion contact each other at least in two points at the cross-section. For example, the cross-section may be a pentagon as shown in FIG. 15(a), the base may be curved, substantially U-character-shaped as shown in FIG. 15(b), or the base may be a trapezoid, the base of which is a plane, as shown in FIG. 15(c). Also, as shown in FIG. 15(d), the base may have such a shape as to have a convex portion. In this case, the optical component and the groove portion contact each other in three points. According to the present invention, the optical component and the inner wall of the groove portion may be configured such that they contact each other in further portions, but it is preferable to contact in two points in terms of easiness in manufacture and providing stability easily during placement.

In each embodiment, a placement member according to the present invention corresponds to the V-grooved substrate 4, 34, 35 and the like, and an optical device according to the present invention corresponds to a device to be configured by each portion with the exception of the optical functional device 6 in each embodiment.

As described above in detail, an optical communication component according to the embodiments of the present invention consists of an optical functional device, bi-convex or single convex lens and a substrate having a groove, and the optical functional device and the lens are placed such that their optical axes are in parallel to the groove of the substrate. Accordingly, it is possible to provide an optical communication component easier in assembly, lower in manufacturing cost in a simpler configuration than the conventional examples.

An optical communication component according to another embodiment of the present invention has an input fiber and an output fiber, and the fiber or ferrule for holding the fiber is caused to be equal to the outer diameter of the lens, whereby it is possible to easily perform optical adjustment and to reduce the manufacturing cost.

In the optical communication component according to another embodiment of the present invention, the lens is caused to contact the end of the fiber, whereby it is possible to easily perform optical adjustment and to reduce the manufacturing cost.

In the optical communication component according to another embodiment of the present invention, a bi-convex lens or a single convex cylindrical lens is used for the lens, whereby it is possible to easily perform optical adjustment and to reduce the manufacturing cost.

In the optical communication component according to another embodiment of the present invention, the lens is a graded-index lens, whereby it is possible to easily perform optical adjustment and to reduce the manufacturing cost.

In the optical communication component according to another embodiment of the present invention, a lens having a refractive index of 2 or closest thereto is used for the lens, whereby it is possible to easily perform optical adjustment and to reduce the manufacturing cost.

In the optical communication component according to another embodiment of the present invention, an optical functional device in the optical communication component according to the present invention has wavelength separating and combining functions, whereby it is possible to provide a low-priced optical multiplexer or optical demultiplexer in a simple configuration.

In the optical communication component according to another embodiment of the present invention, an optical functional device in the optical communication component according to the present invention has polarization separating and synthesizing functions, whereby it is possible to provide a low-priced optical polarization synthesizing/splitter in a simple configuration.

In the optical communication component according to another embodiment of the present invention, an optical functional device in the optical communication component according to the present invention has an optical attenuation function, whereby it is possible to provide a low-priced optical attenuator in a simple configuration.

In the optical communication component according to another embodiment of the present invention, an optical functional device in the optical communication component according to the present invention has an optical isolator, whereby it is possible to provide a low-priced optical isolator in a simple configuration.

In the optical communication component according to another embodiment of the present invention, an optical functional device in the optical communication component according to the present invention has an optical circulator, whereby it is possible to provide a low-priced optical circulator in a simple configuration.

In the optical communication component according to another embodiment of the present invention, an optical functional device in the optical communication component according to the present invention has an optical terminating function, whereby it is possible to provide a low-priced optical terminating apparatus in a simple configuration.

In the optical communication component according to another embodiment of the present invention, an optical functional device in the optical communication component according to the present invention has an optical modulating function, whereby it is possible to provide a low-priced optical modulater in a simple configuration.

An optical functional device in the component has optical branching and synthesizing functions, whereby it is possible to provide a low-priced optical branch or synthesizing device in a simple configuration.

In the optical communication component according to another embodiment of the present invention, an optical functional device in the optical communication component according to the present invention has an optical switching function, whereby it is possible to provide a low-priced optical switch in a simple configuration.

In the optical communication component according to another embodiment of the present invention, an optical functional device in the optical communication component according to the present invention has an optical amplifying function, whereby it is possible to provide a low-priced optical amplifier in a simple configuration.

In the optical communication component according to another embodiment of the present invention, an optical functional device in the optical communication component according to the present invention has a wavelength converting function, whereby it is possible to provide a low-priced wavelength converter in a simple configuration.

In the optical communication component according to another embodiment of the present invention, an optical functional device in the optical communication component according to the present invention has a light emitting function, whereby it is possible to provide a low-priced optical transmitter in a simple configuration.

In the optical communication component according to another embodiment of the present invention, an optical functional device in the optical communication component according to the present invention has a light receiving function, whereby it is possible to provide a low-priced optical receiver in a simple configuration.

In the optical communication component according to another embodiment of the present invention, an optical functional device in the optical communication component according to the present invention has a polarization converting function, whereby it is possible to provide a low-priced polarization converter in a simple configuration.

In the optical transmission apparatus according to another embodiment of the present invention, any of the optical communication components according to the present invention is provided, whereby it is possible to provide a low-priced optical transmission apparatus capable of greatly increasing the transmission capacity in a simple configuration.

As will be apparent from the foregoing description, according to the present invention, it is possible to provide an optical communication component easier in assembly, lower in manufacturing cost in a simpler configuration than the conventional examples.

What is claimed is:

1. An optical device, comprising:

at least two first optical components;

a second optical component placed between said first optical components, or at an intersection point of optical axes to be formed by said first optical components; and a placement member for placing said first optical component and said second optical component, wherein said placement member has at least a groove portion for placing said first optical component, and each portion of said first optical component and each portion of said groove portion have such a shape and size that optical axes to be formed by said first optical components are positioned within the same plane respectively in a state in which said first optical components are all placed on said groove portion.

2. The optical device according to claim 1, wherein optical axes of said first optical components are formed to become parallel said groove portion on which said first optical component is placed.

3. The optical device according to claim 1, wherein said first optical components and an inner wall of said groove portion are at least in point-contact at least at two points at cross-sectional view direction of said groove portion.

4. The optical device according to claim 1, wherein a convex portion or a concave portion having a predetermined shape is formed at a position on said placement member whereat said second optical component is placed, and on a base of said second optical component, there is formed a concave portion or a convex portion having a shape, which corresponds to said convex portion or concave portion having said predetermined shape of said placement member.

5. The optical device according to claim 4, wherein said predetermined shape is any of shapes of a polygon pyramid, a cone, a polygon pillar, and a column or substantially hemispherical shape.

6. The optical device according to claim 4, wherein said convex portion or concave portion having said predetermined shape is formed when each of said grooved portions is extended, and is intersected each other at a position whereat said second optical component is placed.

7. The optical device according to any one of claims 1 to 4, further comprising a clamping member for fixing said first optical components and said second optical component in cooperation with said placement member, wherein said first optical components and said second optical component are fixed in such a manner as to be sandwiched between said clamping member and said placement member, and said first optical component is fixed in a state where it can be freely inserted and removed.

8. The optical device according to any one of claims 1 to 4, further comprising a clamping member for fixing said first optical components and said second optical component in cooperation with said placement member, wherein said first optical components and said second optical component are fixed in such a manner as to be sandwiched between said clamping member and said placement member, an upper portion of said first optical components are exposed on a principal surface of said placement member other than said groove portion in a state where said first optical components are placed on said groove portion, and said clamping member is fixed by contact with said exposed upper portion of said first optical components.

9. The optical device according to any one of claims 1 to 4, wherein said first optical components or said second optical component include at least a lens and/or an optical fiber.

10. The optical device according to any one of claims 1 to 4, wherein said first optical components or said second optical component include at least a ferrule provided at an end portion of said optical fiber.

11. The optical device according to claim 9, wherein within said groove portion, an end surface of said lens and an end surface of said optical fiber are in point-contact or plane-contact.

12. The optical device according to claim 9, wherein a focus of said lens is positioned on an end surface of said optical fiber.

13. The optical device according to claim 12, wherein said lens is a bi-convex or single convex cylindrical lens.

14. The optical device according to claim 12, wherein said lens is a graded-index lens.

15. The optical device according to claim 12, wherein said lens is a spherical lens having a refractive index of 2 or closest thereto.

16. An optical communication compponent using the optical device according to claim 1, wherein said second optical component includes at least an optical functional device.

17. The optical communication component according to claim 16, wherein said optical functional device has wavelength separating and/or combining functions.

18. The optical communication component according to claim 16, wherein said optical functional device has polarization separating and/or synthesizing functions.

19. The optical communication component according to claim 16, wherein said optical functional device has an optical attenuation function.

20. The optical communication component according to claim 16, wherein said optical functional device has an optical isolator.

21. The optical communication component according to claim 16, wherein said optical functional device has an optical circulator.

22. The optical communication component according to claim 16, wherein said optical functional device has an optical terminating function.

23. The optical communication component according to claim 16, wherein said optical functional device has an optical modulating function.

24. The optical communication component according to claim 16, wherein said optical functional device has optical branching and/or synthesizing functions.

25. The optical communication component according to claim 16, wherein said optical functional device has an optical switching function.

26. An optical communication component according to claim 16, wherein said optical functional device has light amplifying function.

27. The optical communication component according to claim 16, wherein said optical functional device has a wavelength converting function.

28. The optical communication component according to claim 16, wherein said optical functional device has a light emitting function.

29. The optical communication component according to claim 16, wherein said optical functional device has a light receiving function.

30. The optical communication component according to claim 16, wherein said optical functional device has a polarization converting function.

31. An optical transmission apparatus, comprising:

the optical communication component according to claim 16;

optical transmission means; and optical receiving means, wherein said optical transmission means and said optical receiving means are connected to each other through said optical communication component.

32. A manufacturing method of an optical device having at least two first optical components; and a second optical component placed between said first optical components, or at an intersection point of optical axes to be formed by said first optical components, comprising the steps of:

forming a groove portion on a placement member body;

forming a placement portion on said placement member body;

placing and fixing said first optical components on said groove portion;

placing said second optical component on said placement portion;

adjusting said second optical component to set an optical path for said second optical component and said first optical components; and fixing said second optical component adjusted.

* * * * *